No. 878,227.

PATENTED FEB. 4, 1908.

J. T. McKEAN.
PLATE HOLDER.
APPLICATION FILED JULY 19, 1907.

WITNESSES
F. E. Maynard,
J. B. Touse

INVENTOR:
John T. McKean;
BY Geo. H. Strong.
ATTORNEY

UNITED STATES PATENT OFFICE.

JOHN T. McKEAN, OF SANTA CRUZ, CALIFORNIA.

PLATE-HOLDER.

No. 878,227.  Specification of Letters Patent.  Patented Feb. 4, 1908.

Application filed July 19, 1907. Serial No. 384,559.

*To all whom it may concern:*

Be it known that I, JOHN T. MCKEAN, citizen of the United States, residing at Santa Cruz, in the county of Santa Cruz and State of California, have invented new and useful Improvements in Plate-Holders, of which the following is a specification.

My invention relates to plate-holders for photographic cameras.

Its object is to provide a double plate-holder having a removable dividing partition, whereby the same plate-holder which is used for taking pictures may be quickly converted into a plate-holder for use in an enlarging camera. Also if the partition becomes warped or buckled as sometimes occurs with ordinary plate-holders, the partition may be quickly taken out and replaced by a new one.

The invention consists in the parts and the construction and combination of parts as hereinafter more fully described and claimed, having reference to the accompanying drawings, in which—

Figure 1:
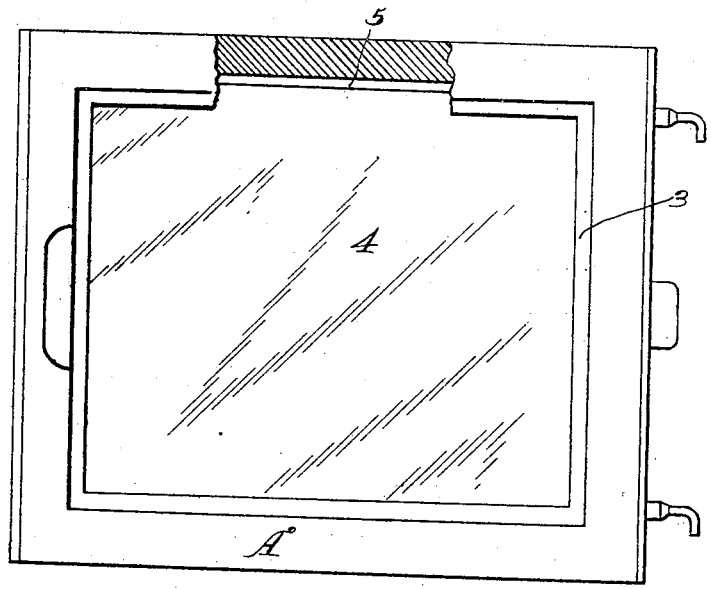
Figure 2:
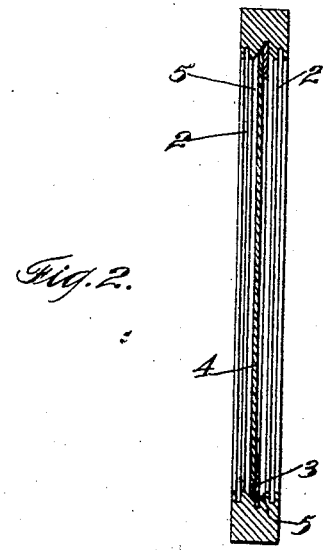
Figure 3:
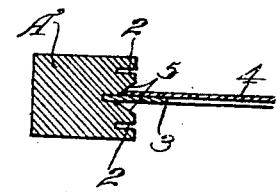

Figure 1 is a plan view of the device, partly in section. Fig. 2 is a transverse section. Fig. 3 is an enlarged detail section.

A represents the frame of a double plate-holder having the usual guide grooves 2 for the slides, which latter are not shown. A partition or diaphragm between the plates is always necessary in order to cut off the light from one plate while the other is being exposed. The partition here constitutes my invention and comprises a fixed rim portion or flange or seat 3 and a removable center 4. The rim is just deep enough to afford a support for the edges of the center piece 4 so that no light will get around the latter when one of the slides is removed. The rim flange 3 also forms a support for the negative when the slides and center piece are removed and the holder is used in an outfit for making enlargements where the light has to pass through the negative. Naturally the opening in the rim is smaller than the inside measurement of the frame A.

The rim flange may be made of any suitable stiff, thin material, as sheet-metal, papier-mâché, cardboard, hard rubber, etc. The center piece 4 is of flexible opaque material like cardboard or hard rubber, and is a little wider than the inside width of the frame A and approximately about as long as the inside length of the frame so that it may be sprung into the grooves 5 in the frame, and seated against the rim flange 3. This center piece being quickly removable permits the double use of the holder in the manner described. If the center piece becomes warped or worn it is replaced quickly and at small expense. The cost of the holder is not increased to any appreciable extent and it serves to do away with the expensive or cumbersome plate-holding device commonly used in enlarging outfits. Since the center piece is removed from the side through the plate opening in the frame just as a plate is inserted and taken out, it does not require an expensive frame; and by not having to cut grooves in the sides or ends of the frame there is just that much less danger of light leaks.

Having thus described my invention, what I claim and desire to secure by Letters Patent is—

1. A plate-holder having a sectional partition, removable and insertible through the plate opening in the frame.

2. A plate-holder comprising a frame and a partition, said partition consisting of a fixed rim flange portion and a removable flexible center to seat against said rim flange, substantially as described.

In testimony whereof I have hereunto set my hand in presence of two subscribing witnesses.

JOHN T. McKEAN.

Witnesses:
 CHARLES J. GILLEN,
 WILLIAM R. HEDGPETH.